(12) United States Patent
Kurokawa et al.

(10) Patent No.: US 11,390,313 B2
(45) Date of Patent: Jul. 19, 2022

(54) ELECTRICALLY ADJUSTABLE STEERING COLUMN

(71) Applicant: NSK LTD., Tokyo (JP)

(72) Inventors: Yoshifumi Kurokawa, Ann Arbor, MI (US); Jessica Elaine Lipa, Saline, MI (US)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/241,245

(22) Filed: Apr. 27, 2021

(65) Prior Publication Data

US 2021/0339790 A1     Nov. 4, 2021

Related U.S. Application Data

(60) Provisional application No. 63/018,128, filed on Apr. 30, 2020.

(51) Int. Cl.
*B62D 1/181* (2006.01)
*B62D 1/19* (2006.01)
*B62D 1/185* (2006.01)

(52) U.S. Cl.
CPC .............. *B62D 1/181* (2013.01); *B62D 1/185* (2013.01); *B62D 1/192* (2013.01)

(58) Field of Classification Search
CPC ......... B62D 1/181; B62D 1/185; B62D 1/192
See application file for complete search history.

(56) References Cited

U.S. PATENT DOCUMENTS

| | | | | |
|---|---|---|---|---|
| 2,584,636 A * | 2/1952 | Sprinkel | ................... | B62D 1/22 74/494 |
| 9,260,130 B2 * | 2/2016 | Mizuno | ................... | B62D 1/181 |
| 2005/0193855 A1 * | 9/2005 | Sadakata | ................. | B62D 1/192 74/496 |
| 2006/0028010 A1 * | 2/2006 | Yamada | ................... | B62D 1/184 280/775 |
| 2008/0079253 A1 * | 4/2008 | Sekii | ...................... | B62D 1/181 280/775 |
| 2009/0266187 A1 * | 10/2009 | Okada | ..................... | F16H 25/24 74/89.23 |
| 2017/0120944 A1 * | 5/2017 | Kato | ...................... | B62D 1/181 |
| 2018/0251147 A1 * | 9/2018 | Heitz | ..................... | B62D 1/185 |
| 2019/0225255 A1 * | 7/2019 | Ishimura | ............... | B62D 1/181 |
| 2021/0146987 A1 * | 5/2021 | Nagy | ..................... | B62D 1/184 |
| 2021/0237791 A1 * | 8/2021 | Geiselberger | .......... | B62D 1/195 |
| 2021/0394813 A1 * | 12/2021 | Kurokawa | ............ | B62D 1/189 |

FOREIGN PATENT DOCUMENTS

| | | | | |
|---|---|---|---|---|
| CN | 101152874 A | * | 4/2008 | ............ B62D 1/181 |
| JP | 2001199350 A | * | 7/2001 | ............ B62D 1/181 |
| WO | WO-2021224200 A1 | * | 11/2021 | ............ B62D 1/181 |

OTHER PUBLICATIONS

Declaration dated Feb. 19, 2022.

* cited by examiner

*Primary Examiner* — Drew J Brown
(74) *Attorney, Agent, or Firm* — Sughrue Mion, PLLC

(57) ABSTRACT

A steering jacket includes a first jacket member and a second jacket member in this order from a side proximal to a steering wheel, and the first jacket member and the second jacket member overlap each other such that the steering jacket is extendable and retractable in an axial direction. An actuator is connected to an extension bracket that is attached to an outer surface of the first jacket member and extends toward the front of a vehicle body, so as to extend and retract the first jacket member with respect to the second jacket member.

7 Claims, 18 Drawing Sheets

ELECTRICALLY ADJUSTABLE STEERING COLUMN

CROSS REFERENCE TO RELATED APPLICATIONS

The present application is based on U.S. Provisional Patent Application No. 63/018,128 filed on Apr. 30, 2020, the contents of which are incorporated herein by reference.

TECHNICAL FIELD

The present invention relates to an electrically adjustable steering column.

RELATED ART

In the related art, it is know that a steering apparatus for a vehicle includes an electric or manual tilt mechanism or telescopic mechanism such that a position of a steering wheel can be changed in accordance with the physique or posture of a driver.

For example, an electrically adjustable steering column 1 shown in FIGS. 12A and 12B is provided with a telescopic mechanism 20 that extends and retracts a steering shaft 3 to which a steering wheel 2 is connected and a steering jacket 4 that rotatably supports the steering shaft 3. The steering shaft 3 includes an outer shaft 11 and an inner shaft 12 that are extendable and retractable in an axial direction, and the steering jacket 4 includes an outer jacket 13 and an inner jacket 14 that are extendable and retractable in the axial direction.

An actuator of the telescopic mechanism 20 includes a motor 21, a screw shaft 22 that is rotationally driven by the motor 21, and a nut 23 to be screwed to the screw shaft 22. The motor 21 is fixed to one end of the outer jacket 13, and the nut 23 is coupled to a protruding portion 15 that protrudes in a radial direction from a vehicle front side end portion of the inner jacket 14 that is opposite to the steering wheel 2. The protruding portion 15 of the inner jacket 14 protrudes outward from the outer jacket 13 through a long hole 16 provided in a side surface of the outer jacket 13.

As shown in FIG. 12C, when the motor 21 is driven to rotate the screw shaft 22, the nut 23, that is, the inner jacket 14 moves in the axial direction (left direction in the drawing) and is drawn into and accommodated in the outer jacket 13. At this time, the inner shaft 12 is accommodated in the outer shaft 11.

However, in the related art in the sense of an application of prior art to achieve a longer telescope stroke than normal, the electrically adjustable steering column 1 necessitates the large slot-shaped long hole 16 in the side surface of the outer jacket 13, and therefore, there is a problem that the bending rigidity of the steering jacket 4 is reduced, and there is room for improvement. Further, in order to increase the stroke of the telescopic mechanism 20, it is necessary to dispose the motor 21 so as to protrude further toward the vehicle front side than a front end portion of the outer jacket 13, and as a result, there is a problem in layout that the entire length of the steering jacket 4 is increased.

SUMMARY OF THE INVENTION

In view of the above-described issues, an object of the present invention is to provide an electrically adjustable steering column including a telescopic mechanism capable of ensuring rigidity without providing a long hole in a side surface of a steering jacket.

According to an aspect of the present invention, there is provided an electrically adjustable steering column that includes; a top bracket attached to a vehicle body; a steering shaft to which a steering wheel is connected; a steering jacket held by the top bracket and configured to rotatably support the steering shaft on an inner side; and an actuator configured to adjust lengths of the steering shaft and the steering jacket. The steering jacket includes a first jacket member and a second jacket member in this order from a side proximal to the steering wheel, and the first jacket member and the second jacket member overlap each other such that the steering jacket is extendable and retractable in an axial direction. The actuator is connected to an extension bracket that is attached to an outer surface of the first jacket member and extends toward the front of the vehicle body, so as to extend and retract the first jacket member with respect to the second jacket member.

According to the present invention, the telescopic mechanism can be configured while ensuring the rigidity of the steering jacket without providing a long hole in the side surface of the steering jacket.

DESCRIPTION OF EMBODIMENTS

Hereinafter, embodiments of an electrically adjustable steering column according to the present invention will be described in detail with reference to the drawings.

In the present specification, the terms "front" and "rear" respectively refer to the front and rear of an electrically adjustable steering column with the electrically adjustable steering column attached to a vehicle body, and match a front and rear directions of the vehicle, respectively. The term "axial direction" refers to a direction along an axis of a steering shaft.

First Embodiment

Figure 1A:
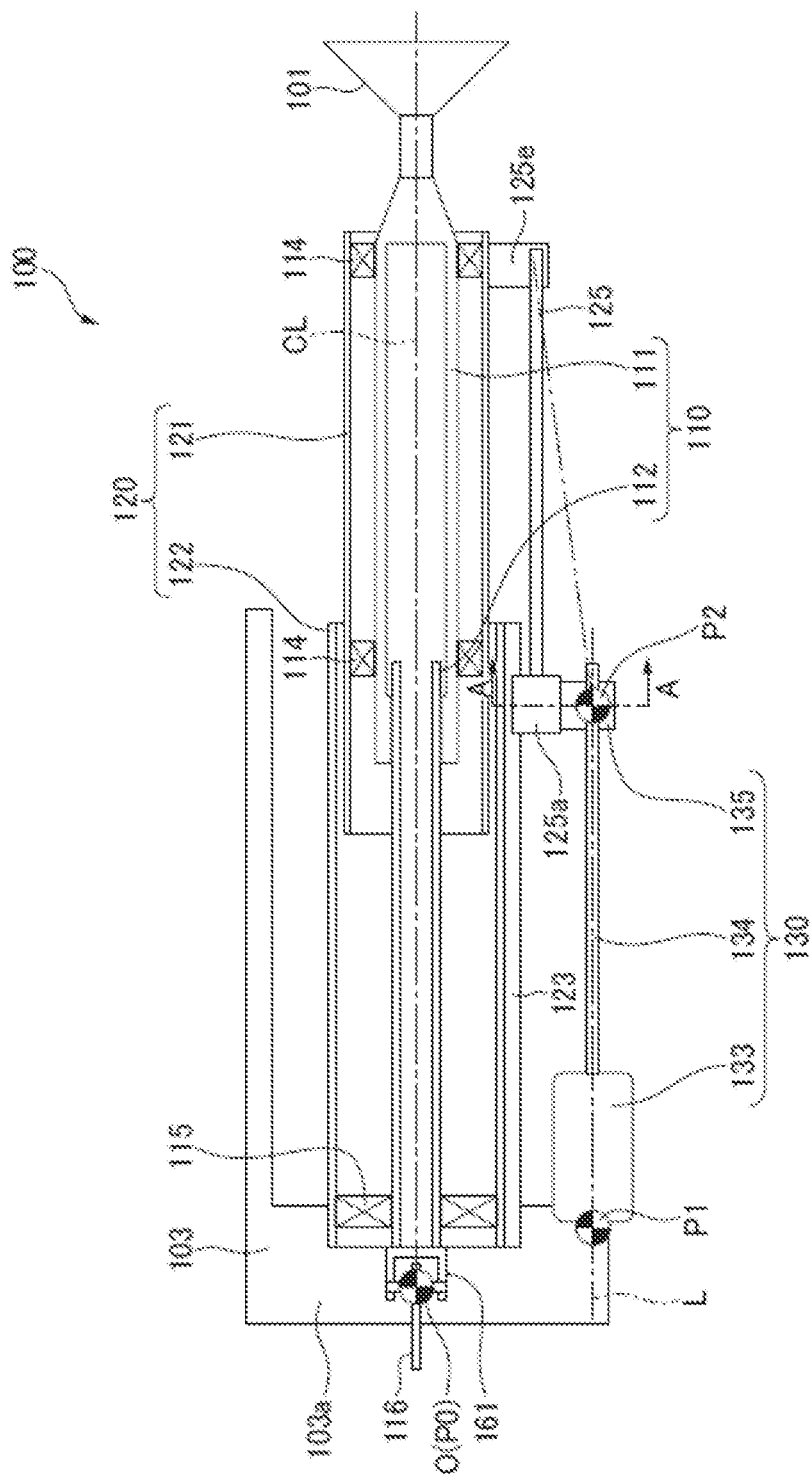
FIG. 1A is a sectional view schematically showing an extended state of an electrically adjustable steering column according to a first embodiment of the present invention.
Figure 1B:
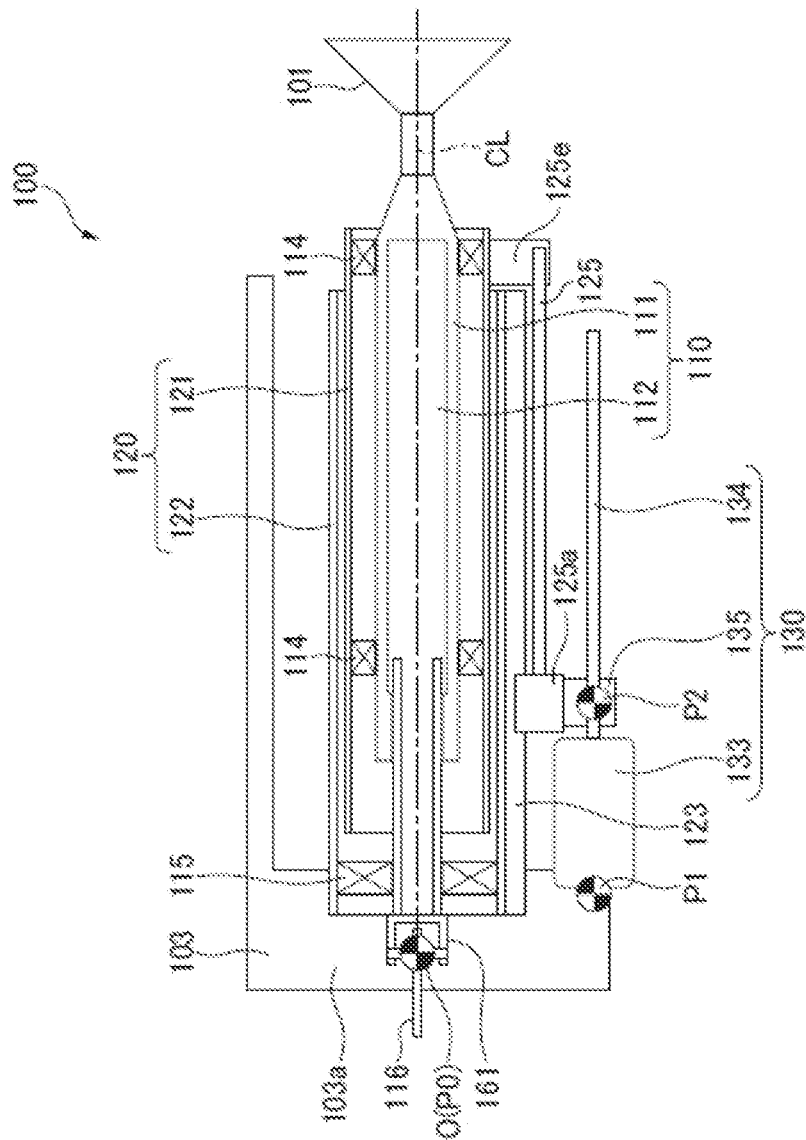
FIG. 1B is a sectional view schematically showing a retracted state of the electrically adjustable steering column shown in FIG. 1A.

FIG. 1A is a sectional view of an electrically adjustable steering column in a state where a steering shaft and a steering jacket are extended in an axial direction, and FIG. 1B is a sectional view of the electrically adjustable steering column in a state where the steering shaft and the steering jacket are retracted in the axial direction.

In the present embodiment, a telescopic mechanism that adjusts a position of a steering wheel in the axial direction will be mainly described, and the description of a tilt mechanism that adjusts a position of the steering wheel in an upper-lower direction will be omitted or simplified.

As shown in FIGS. 1A and 1B, an electrically adjustable steering column 100 according to the first embodiment includes a top bracket 103 attached to a vehicle body, a steering shaft 110 to which a steering wheel 101 is connected and which is rotated by the steering wheel 101, a steering jacket 120 that rotatably supports the steering shaft 110 on an inner side, and a telescopic actuator 130 that adjusts a front-rear position of the steering wheel 101, that is, the lengths of the steering shaft 110 and the steering jacket 120.

The steering shaft 110 includes a first shaft member 111 and a second shaft member 112 in this order from the steering wheel 101 side. The first shaft member 111 and the second shaft member 112 overlap each other so as to be able to transmit rotation to each other by serration fitting or the like and to be able to extend and retract in an axial direction. Specifically, the steering wheel 101 is connected to the first shaft member 111, and the second shaft member 112 is fitted into a front end portion of the first shaft member 111 so as to be extendable and retractable with respect to the first shaft member 111.

It is preferable that the first shaft member 111 and the second shaft member 112 have a structure that cannot be mechanically separated from each other when the steering shaft 110 extends and retracts. Specifically, this structure is implemented by coupling the shaft members with a stopper provided between the shaft members, or a stopper provided in another component (for example, a jacket member) whose position in the axial direction is sufficiently limited so as to prevent the first shaft member 111 and the second shaft member 112 from separating.

The steering jacket 120 includes a first jacket member 121 and a second jacket member 122 around the steering shaft 110 in this order from the steering wheel 101 side. The first and second jacket members 121 and 122 are coaxially arranged and overlap each other so that the steering jacket 120 can extend and retract in the axial direction. An outer diameter of the first jacket member 121 is smaller than an inner diameter of the second jacket member 122. Therefore, the first jacket member 121 is accommodated in the second jacket member 122 in an extendable and retractable manner.

It is preferable that the first jacket member 121 and the second jacket member 122 have a structure that cannot be mechanically separated from each other when the steering jacket 120 extends and retracts. Specifically, this structure is implemented by coupling the jacket members with a jacket shape such as an outward or inward protrusion constituting a stopper between the jacket members, or a stopper provided in another component (for example, in the telescopic actuator 130 to limit the stroke of a nut described later) that serves to indirectly limit the stroke of the steering jacket 120.

An extension bracket 125 that protrudes outward in the radial direction from an end portion on the steering wheel side and extends toward the front of the vehicle body (left direction in the drawing) along the outer periphery on an outer side in the radial direction of the second jacket member 122 is provided on an outer peripheral side of the first jacket member 121. That is, the extension bracket 125 is provided on an outer peripheral surface of the first jacket member 121 on the steering wheel side, and is coupled to a bracket support portion 125e that protrudes more outward in the radial direction than an outer peripheral surface of the second jacket member 122.

A portion of the second jacket member 122 on a vehicle front side is coupled to the front support portion 103a of the top bracket 103 such that the steering jacket 120 is rotatable about a pivot P0. The first jacket member 121 rotatably supports the first shaft member 111 by a pair of built-in bearings 114, 114. Further, the second jacket member 122 rotatably supports the second shaft member 112 by a built-in bearing 115. That is, the steering jacket 120 rotatably supports the steering shaft 110 by the bearings 114, 114, and 115 fitted therein.

Figure 2:
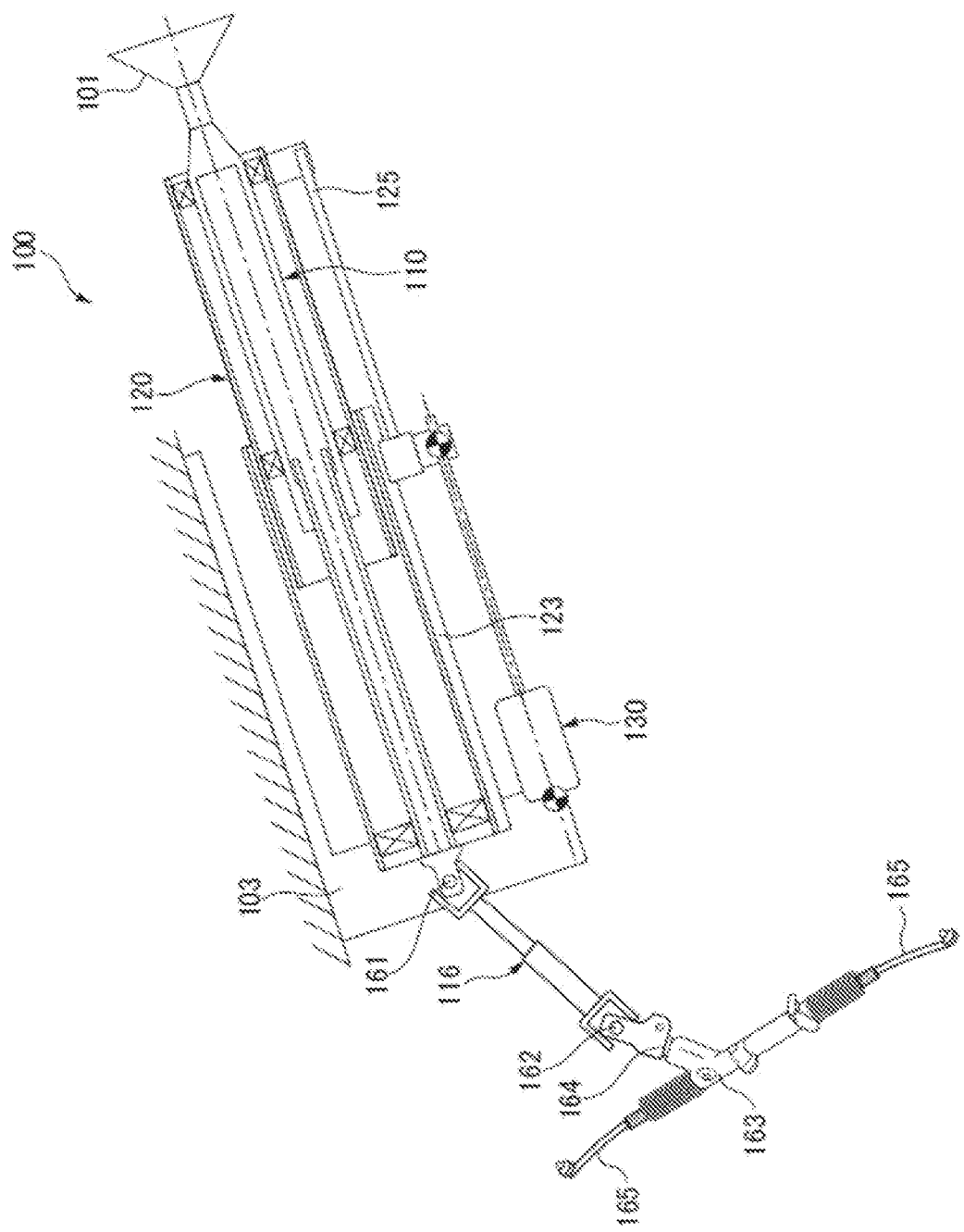
FIG. 2 is a schematic diagram for illustrating that an operation of a steering wheel is transmitted to a tie rod.

A universal coupling 161 is disposed at a front end portion of the second shaft member 112 so that the steering shaft 110 can be smoothly bent at the time of tilting. Therefore, as shown in FIG. 2, the second shaft member 112 is connected to a pinion shaft 164 of a steering gear unit 163 via a pair of universal couplings 161 and 162 and an intermediate shaft 116. As a result, the pinion shaft 164 is rotated via the steering shaft 110 by rotating the steering wheel 101. The rotation of the pinion shaft 164 is converted into a linear motion of a rack shaft by the steering gear unit 163, so that a pair of tie rods 165 are pushed and pulled, and a steering angle corresponding to an operation amount of the steering wheel 101 is applied to a pair of steered wheels.

In addition, it is preferable that a rotation center O of the universal coupling 161 is set at the same position as or a position close to the pivot P0 which is a center point at which the steering jacket 120 rotates at the time of tilting. As the universal coupling 161, a universal joint, a flexible coupling, a rubber shaft joint, a block universal joint, an elastic coupling, or the like can be used.

The telescopic actuator 130 is implemented by a screw shaft rotary actuator including a motor 133, a screw shaft 134 that is rotationally driven by the motor 133, and a nut 135 that is a driven portion to be screwed to the screw shaft 134. The motor 133 is rotatably connected to the top bracket 103 via a pivot P1, and the nut 135 with which the screw shaft 134 is screwed is coupled to an end portion 125a of the extension bracket 125 on the vehicle front side via a pivot P2.

A speed reduction mechanism such as a worm/worm wheel mechanism may be provided between the motor 133 and the screw shaft 134.

Figure 3:
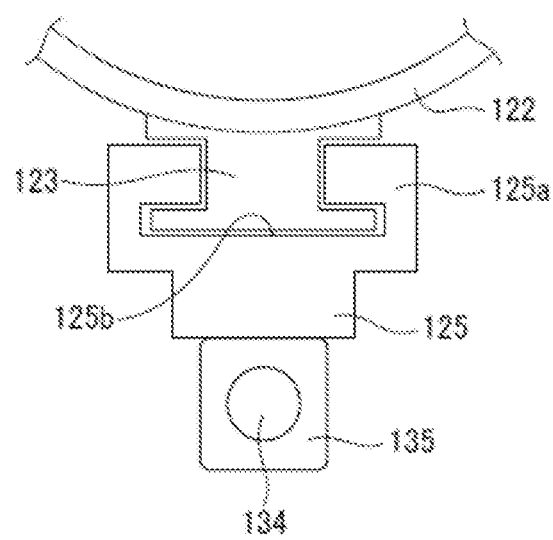
FIG. 3 is a sectional view taken along a line A-A of FIG. 1A showing a guide portion that guides an extension bracket.

The end portion 125a of the extension bracket 125 on the vehicle front side slidably contacts a guide portion 123 provided over the entire outer peripheral surface of the second jacket member 122 in the axial direction. As shown in FIG. 3, the guide portion 123 is a substantially inverted T-shaped protrusion that protrudes in the radial direction from the outer peripheral surface of the second jacket member 122 and whose tip end portion protrudes to both sides in a width direction, and is slidably fitted into a substantially inverted T-shaped groove 125b provided in the end portion 125a of the extension bracket 125. That is, the guide portion 123 is fitted so as to be surrounded by the end portion 125a of the extension bracket 125, and slidably supports the extension bracket 125. Accordingly, the end portion 125a of the extension bracket 125 on the vehicle front side is restricted from moving in a direction orthogonal to a central axis CL of the electrically adjustable steering column 100, that is, from moving in a rotation direction and the radial direction with respect to the guide portion 123.

The end portion 125a of the extension bracket 125 is located rearward of a front end portion of the first jacket member 121.

Then, when the motor 133 of the telescopic actuator 130 is driven to rotate the screw shaft 134, as shown in FIG. 1B, the first jacket member 121 is moved in the axial direction via the nut 135, that is, the extension bracket 125, and is drawn into and accommodated in the second jacket member 122. At this time, the second shaft member 112 of the steering shaft 110 is also accommodated in the first shaft member 111.

Figure 12A:
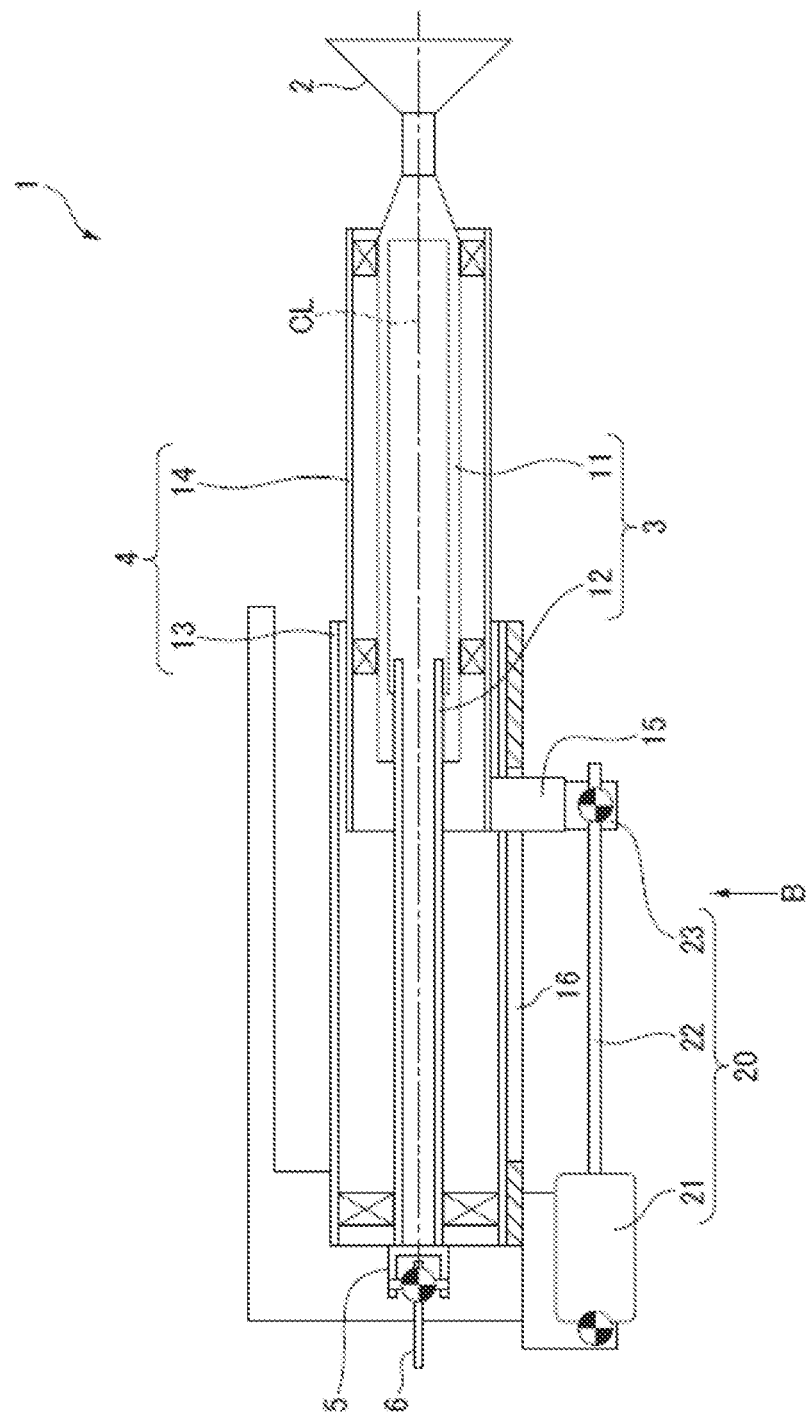
FIG. 12A is a sectional view schematically showing an extended state of an electrically adjustable steering column in the related art.
Figure 12B:
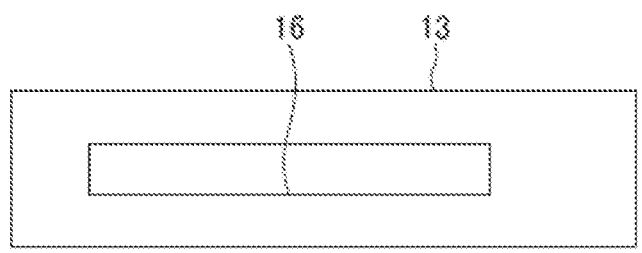
FIG. 12B is a view taken in a direction of arrow B of FIG. 12A, showing a long hole provided in a side surface of an outer jacket.
Figure 12C:
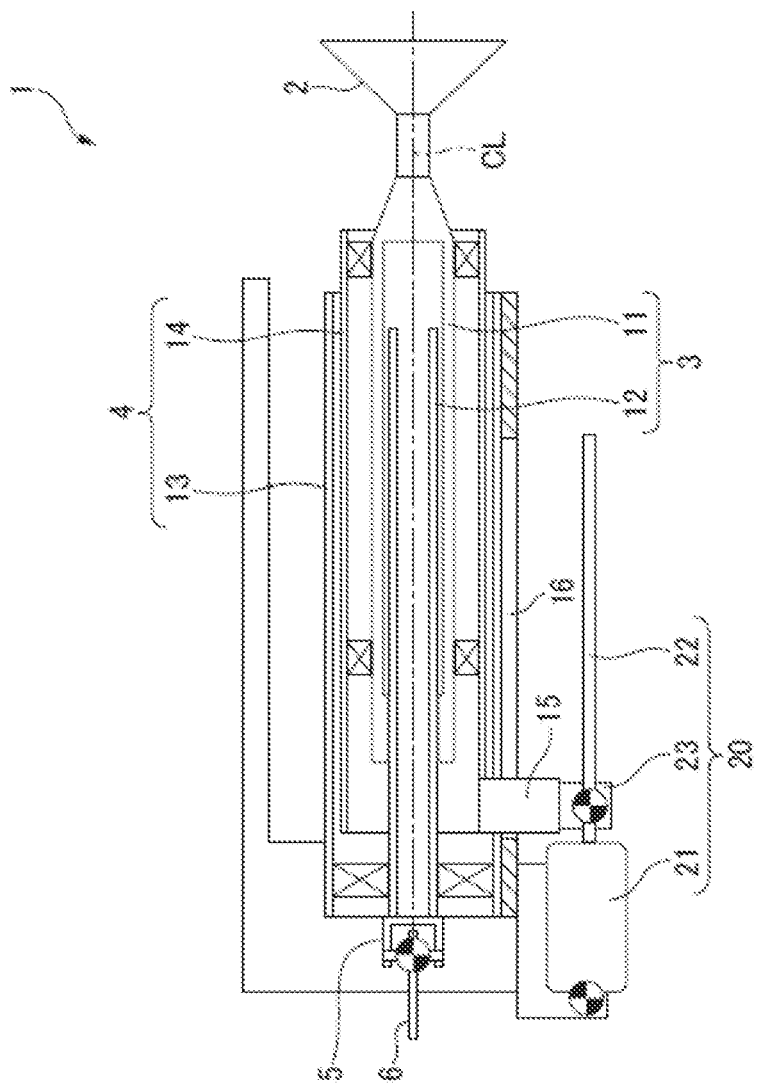
FIG. 12C is a sectional view schematically showing a retracted state of the electrically adjustable steering column in the related art shown in FIG. 12A.

As described above, the extension bracket 125 is provided so as to protrude in the radial direction from the end portion on the steering wheel side and extend toward the front of the vehicle body (the left direction in the drawing) along the outer peripheral surface of the second jacket member 122, so that unlike the electrically adjustable steering column 1 in the related art shown in FIGS. 12A to 12C, the rigidity of the second jacket member 122 can be maintained strongly without providing the long hole 16. Further, in the electrically adjustable steering column 1 in the related art, since the long hole 16 cannot be formed up to the vicinity of a rear end portion of the second jacket member 122, it is necessary to extend the long hole 16 toward the vehicle front side in order to increase the stroke, and the motor 21 of the actuator is required to be disposed closer to the front side. On the other hand, in the present embodiment, the end portion 125a of the extension bracket 125 can be moved to the vicinity of the rear end portion of the second jacket member 122, so that it is not necessary to dispose the motor 133 as close to the vehicle front side, that is, it is possible to increase the stroke of the telescopic mechanism without lengthening the entire length of the electrically adjustable steering column 100.

Further, the end portion 125a of the extension bracket 125 is guided by the guide portion 123 of the second jacket member 122, so that the operation is stable even if the extension bracket 125 becomes long.

With this configuration, it is possible to use the screw shaft rotary actuator 130 which is inexpensive and has a small mechanism around the gear.

Further, by fixing the motor 133 to the top bracket 103 having high rigidity, the natural frequency of the steering jacket 120 can be increased to prevent resonance.

The fitted state between the end portion 125a of the extension bracket 125 and the guide portion 123 may be any one of the four forms shown in FIGS. 4A to 4D, and can be appropriately selected in accordance with the installation environment of the electrically adjustable steering column 100.

Figure 4A:
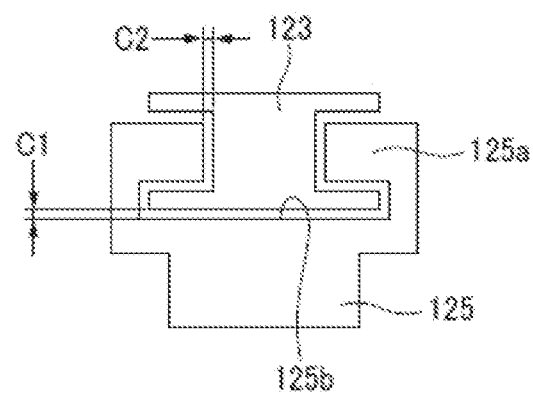
FIG. 4A is a sectional view of a main part showing a fitted state between an end portion of the extension bracket and the guide portion.

For example, as shown in FIG. 4A, the substantially inverted T-shaped groove 125b provided in the end portion 125a of the extension bracket 125 may be provided with both a radial clearance C1 and a rotational clearance C2 between the guide portion 123 and the substantially inverted T-shaped groove 125b. In this case, the end portion 125a of the extension bracket 125 is movable within a range of the clearances C1 and C2 in the rotation direction and the radial direction with respect to the guide portion 123, and the extension bracket 125 is guided to the guide portion 123 without resistance.

Figure 4B:
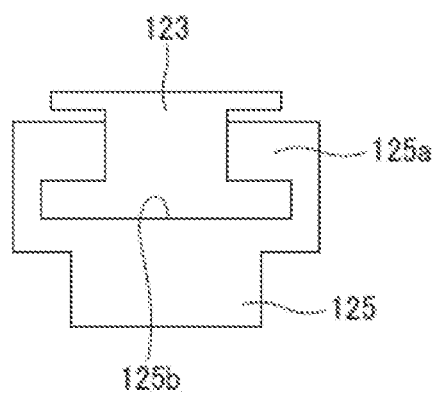
FIG. 4B is a sectional view of a main part showing a fitted state between the end portion of the extension bracket and the guide portion.

As shown in FIG. 4B, the substantially inverted T-shaped groove 125b of the extension bracket 125 may be fitted to the guide portion 123 without a clearance in both the rotation direction and the radial direction. In this case, the movement of the end portion 125a of the extension bracket 125 in both the rotation direction and the radial direction is restricted.

Figure 4C:
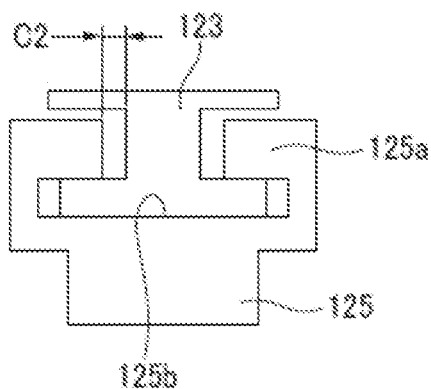
FIG. 4C is a sectional view of a main part showing a fitted state between the end portion of the extension bracket and the guide portion.

As shown in FIG. 4C, the substantially inverted T-shaped groove 125b of the extension bracket 125 and the guide portion 123 may have only the rotational clearance C2 and no radial clearance C1. In this case, the end portion 125a of the extension bracket 125 is movable only in the rotation direction.

Figure 4D:
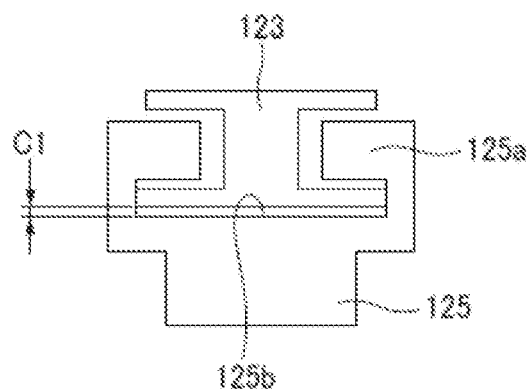
FIG. 4D is a sectional view of a main part showing a fitted state between an end portion of the extension bracket and the guide portion.

Further, as shown in FIG. 4D, the substantially inverted T-shaped groove 125b of the extension bracket 125 and the guide portion 123 may have only the radial clearance C1 and no rotational clearance C2. In this case, the end portion 125a of the extension bracket 125 is movable only in the radial direction.

In the present embodiment, the extension bracket 125 extends in the axial direction at a position offset from a straight line L connecting the pivot P1, which is a coupling point between the top bracket 103 and the motor 133, and the pivot P2, which is a coupling point between the nut 135 and the end portion 125a of the extension bracket 125.

As a result, when an excessive force in the axial direction acts on the electrically adjustable steering column 100 and a compressive force in the axial direction acts on the steering jacket 120 in a vehicle collision or the like, a radially outward (downward in the drawing) component force acts on the pivot P2, which is the coupling point between the nut 135 and the end portion 125a of the extension bracket 125, and the extension bracket 125 is deformed so as to move the pivot P2 radially outward. As a result, a deformation direction of the telescopic actuator 130 and the extension bracket 125 can be controlled.

Figure 5:
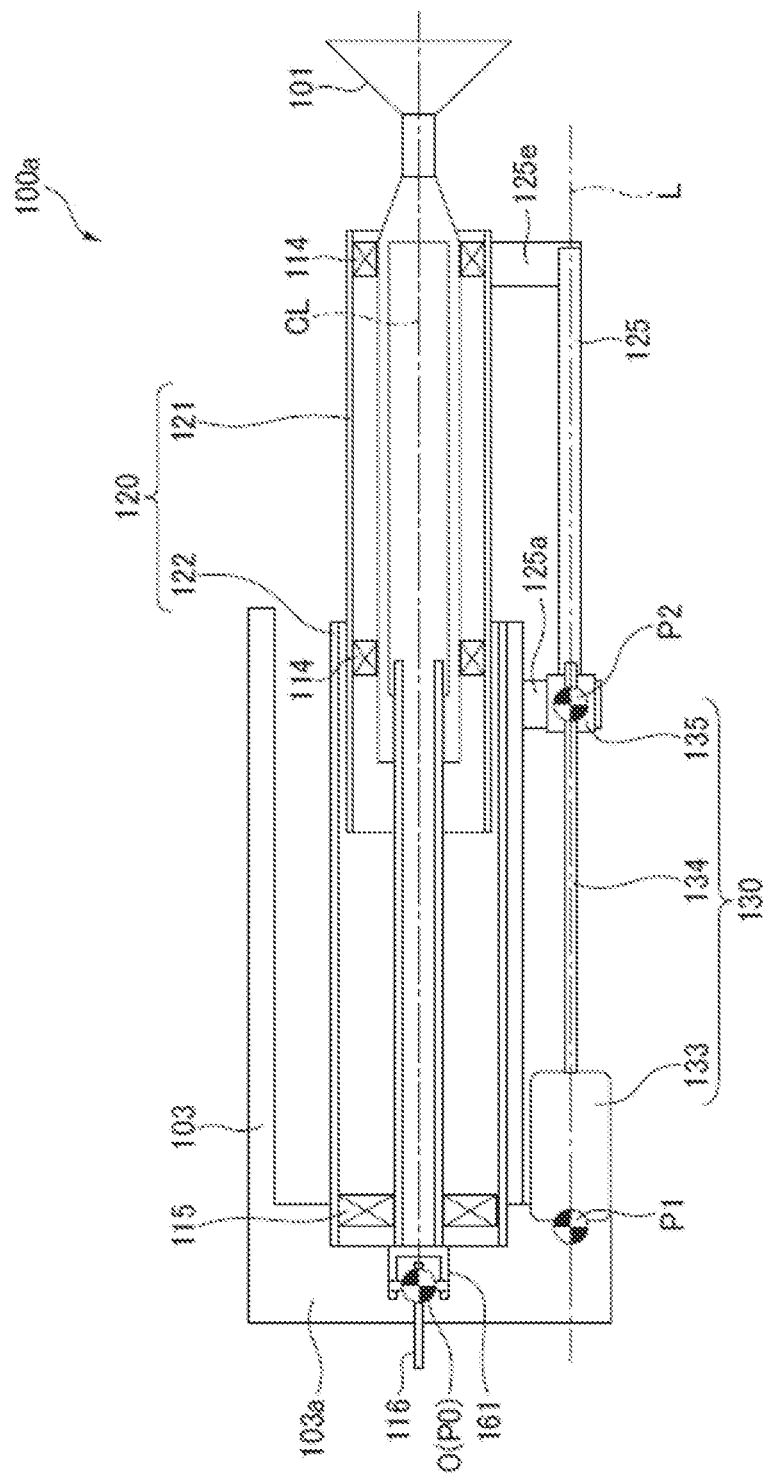
FIG. 5 is a sectional view schematically showing an electrically adjustable steering column according to a reference example.

For example, in an electrically adjustable steering column 100a according to a reference example shown in FIG. 5, the extension bracket 125 extends in an extension line of the straight line L connecting the pivot P1, which is a coupling point between the top bracket 103 and the motor 133, and the pivot P2, which is a coupling point between the nut 135 and the extension bracket 125. In this case, when a compressive force in the axial direction acts on the steering jacket 120, it is difficult to control the deformation direction of the extension bracket 125, which is not preferable.

Therefore, the extension bracket 125 preferably extends in the axial direction at a position offset from the straight line L connecting a coupling point P1 between the motor 133 of the actuator and the top bracket 103, and a coupling point P2 between the nut 135 of the actuator and the extension bracket 125.

Figure 6:
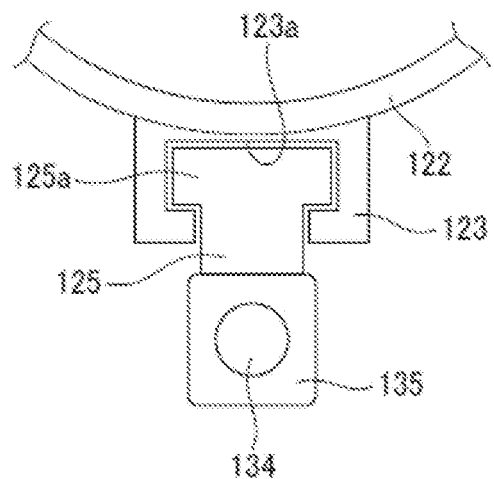
FIG. 6 is a sectional view showing a modification of the guide portion.

The fitted shape between the end portion of the extension bracket and the guide portion may have a configuration as shown in FIG. 6. That is, the end portion 125a of the extension bracket 125 is provided with a substantially T-shaped protrusion, and the guide portion 123 of the second jacket member 122 is formed by a substantially T-shaped groove 123a that slidably supports the end portion 125a so that the end portion 125a is movable.

The end portion 125a of the extension bracket 125 is fitted to the guide portion 123 of the second jacket member 122, so that the movement of the extension bracket 125 in the direction orthogonal to the central axis CL of the electrically adjustable steering column 100 is restricted.

Figure 7A:
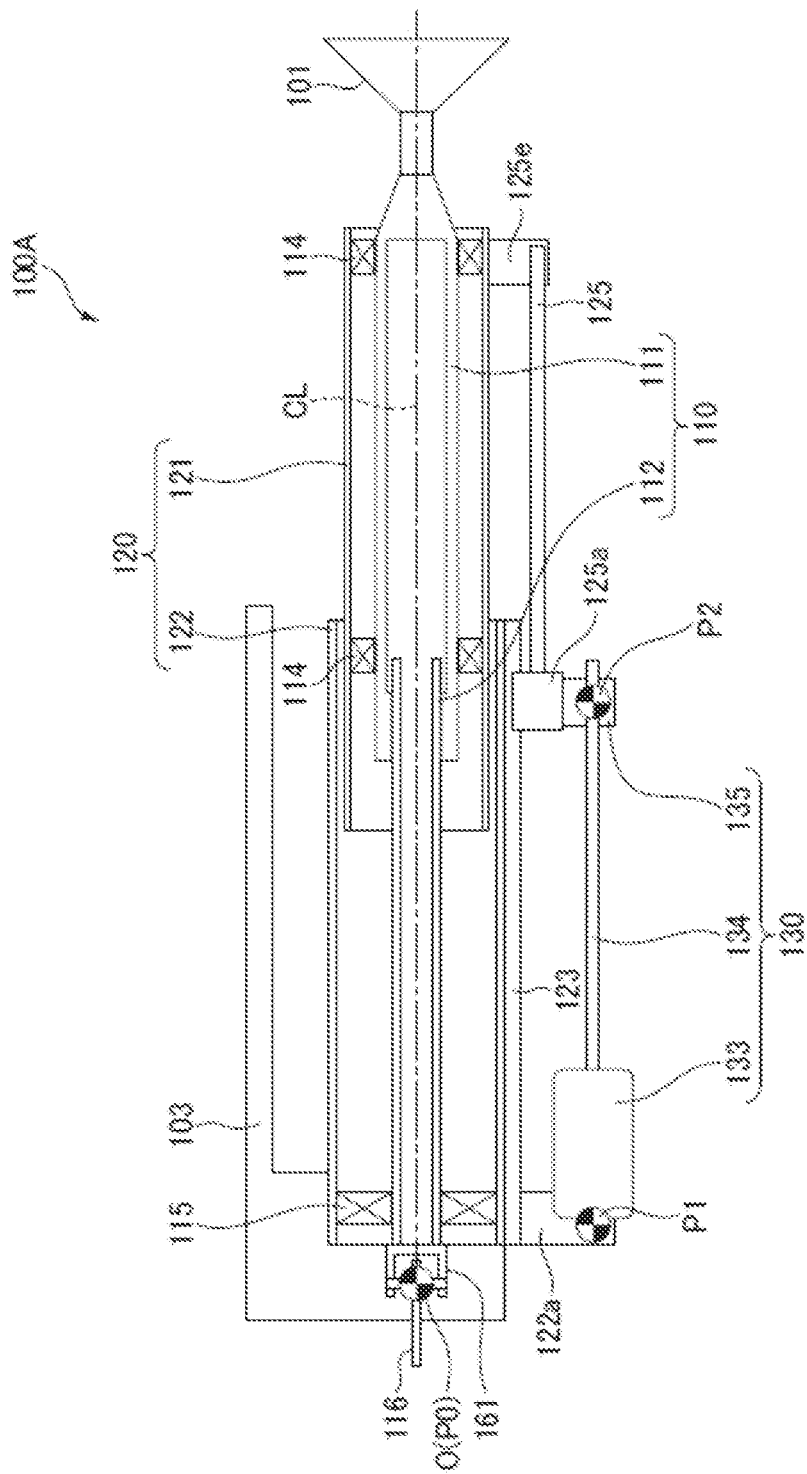
FIG. 7A is a sectional view schematically showing an extended state of an electrically adjustable steering column according to a modification of the first embodiment.
Figure 7B:
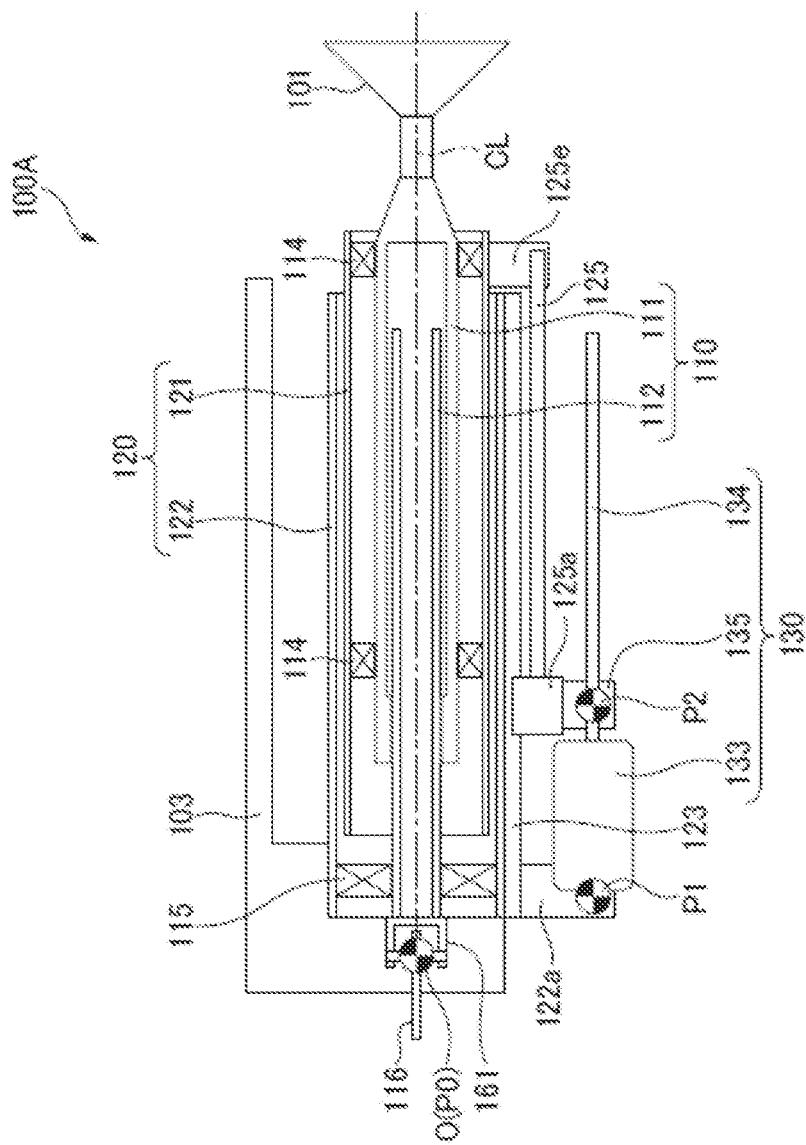
FIG. 7B is a sectional view schematically showing a retracted state of the electrically adjustable steering column shown in FIG. 7A.

As in a modification of the first embodiment shown in FIGS. 7A and 7B, in an electrically adjustable steering column 100A, the motor 133 of the telescopic actuator 130 may be rotatably coupled to an end portion 122a of the second jacket member 122 on the vehicle front side via the pivot P1.

Second Embodiment

Figure 8:
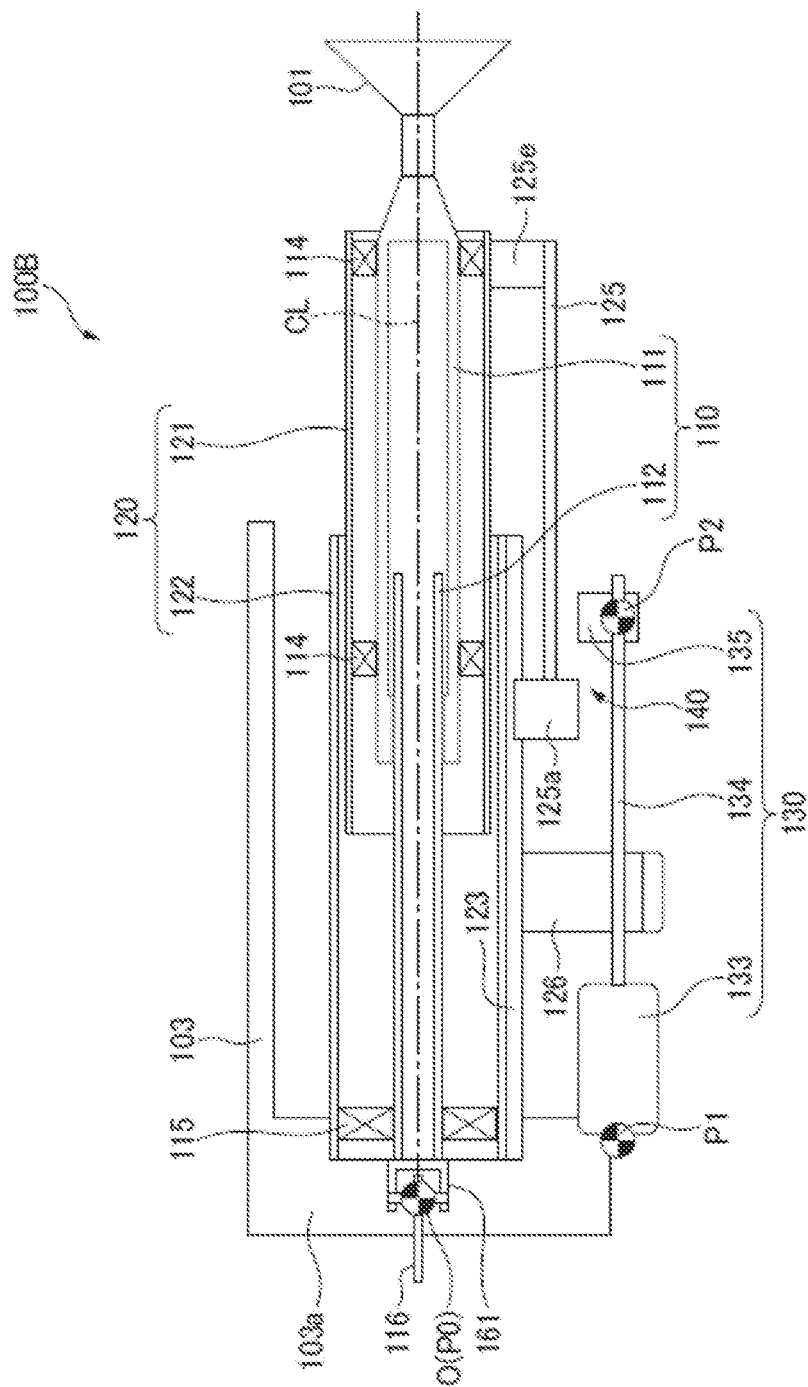
FIG. 8 is a sectional view schematically showing an electrically adjustable steering column according to a second embodiment.

FIG. 8 is a sectional view schematically showing an electrically adjustable steering column according to a second embodiment. In an electrically adjustable steering column 100B according to the second embodiment, a breaking mechanism 140 that releases the connection between the extension bracket 125 and the nut 135 is disposed between the end portion 125a of the extension bracket 125 and the nut 135 of the telescopic actuator 130. Accordingly, even when an excessive force in the axial direction acts on the electrically adjustable steering column 100B at the time of a vehicle collision or the like, the connection between the extension bracket 125 and the nut 135 is released by the breaking mechanism 140, and the impact applied to the driver can be alleviated. As a specific breaking mechanism 140, for example, a configuration is used in which the end portion 125a of the extension bracket 125 and the nut 135 are coupled by a pin made of plastic, and the pin is broken and separated when an excessive force in the axial direction is applied.

Figure 9A:
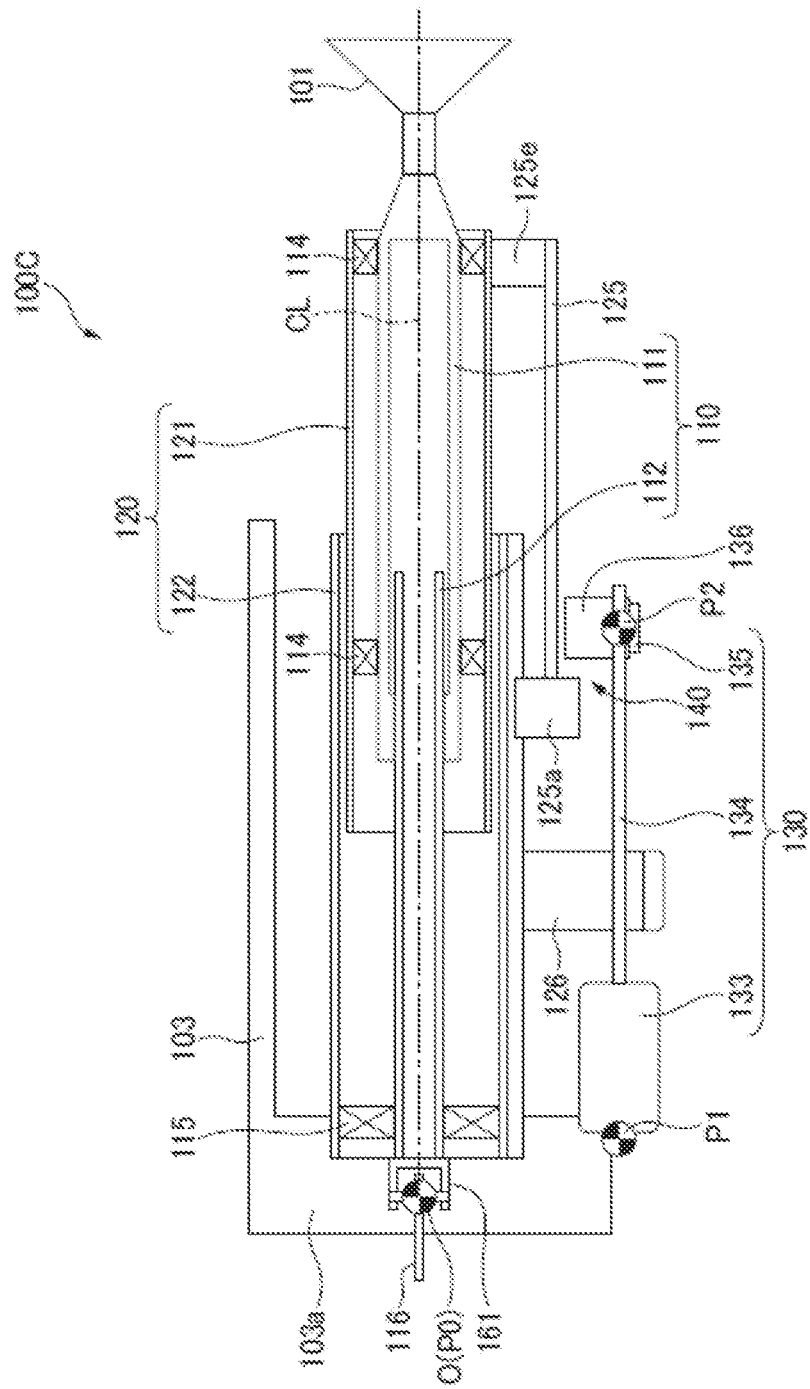
FIG. 9A is a sectional view schematically showing an electrically adjustable steering column according to a first modification of the second embodiment.
Figure 9B:
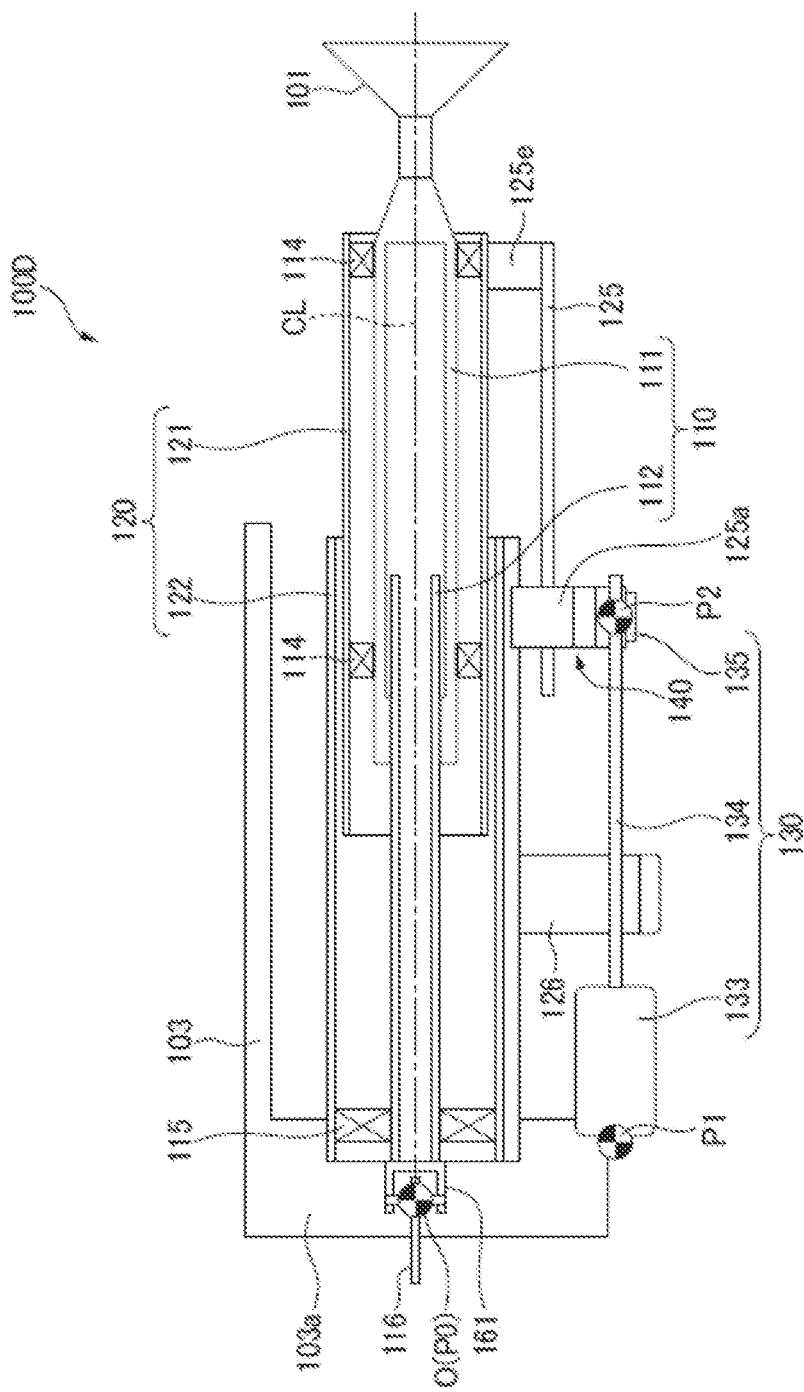
FIG. 9B is a sectional view schematically showing an electrically adjustable steering column according to a second modification of the second embodiment.

Although the breaking mechanism 140 is provided between the end portion 125a of the extension bracket 125 and the nut 135 in FIG. 8, the breaking mechanism 140 may be provided between the end portion 125a of the extension bracket 125 and a nut bracket 136 that accommodates the nut 135, as in an electrically adjustable steering column 100C shown in FIG. 9A. Alternatively, as in an electrically adjustable steering column 100D shown in FIG. 9B, the breaking mechanism 140 may be provided at the end portion 125a of the extension bracket 125.

In addition, a U-shaped fall prevention tool 126 that surrounds the screw shaft 134 of the telescopic actuator 130 from below is provided in a lower portion of the second jacket member 122. As a result, when the connection between the extension bracket 125 and the nut 135 is released and the screw shaft 134 is rotated about the pivot P1 in a clockwise direction in the drawing, the screw shaft 134 and the nut 135 are held by the fall prevention tool 126, so that it is possible to prevent the screw shaft 134 and the nut 135 from interfering with a leg of the driver or a surrounding device.

In addition, one of the nut bracket 136 and the end portion 125a of the extension bracket 125 may be provided with a load generating mechanism (not shown) that generates an absorption load of axial energy generated in the electrically adjustable steering column 100 at the time of a vehicle collision or the like. As the load generating mechanism, for example, a mechanism for curling and deforming a wire or a plate, a mechanism for tearing a plate, or a mechanism for generating a load by a frictional force can be used.

Third Embodiment

Figure 10:
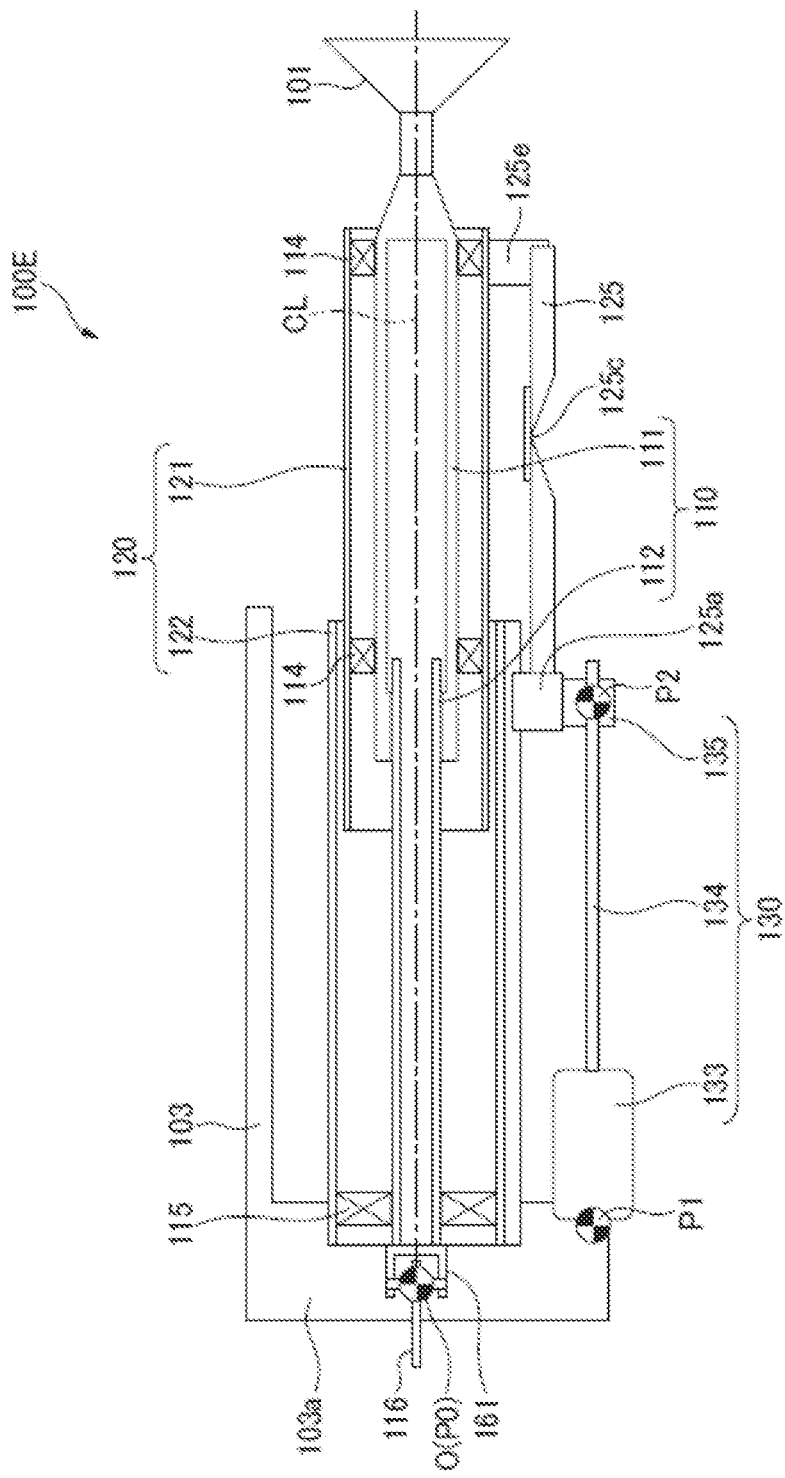
FIG. 10 is a sectional view schematically showing an electrically adjustable steering column according to a third embodiment.

FIG. 10 is a sectional view schematically showing an electrically adjustable steering column according to a third embodiment. In an electrically adjustable steering column 100E according to the third embodiment, the extension bracket 125 is provided with a deformation starting point formed of a substantially inverted V-shaped notch 125c provided at a substantially intermediate portion in the axial direction. The notch 125c is a point where the bending strength of the extension bracket 125 is weaker than that of other parts of the extension bracket 125, and at the time of a vehicle collision, the extension bracket 125 deforms at the notch 125c, and therefore deforms in a predetermined direction in the radial direction. By providing the notch 125c in the extension bracket 125, it is possible to protect the driver by causing the deformation to occur while controlling the deformation direction of the extension bracket 125 in a direction away from the driver, that is, in a direction toward the central axis CL of the electrically adjustable steering column.

Figure 11:
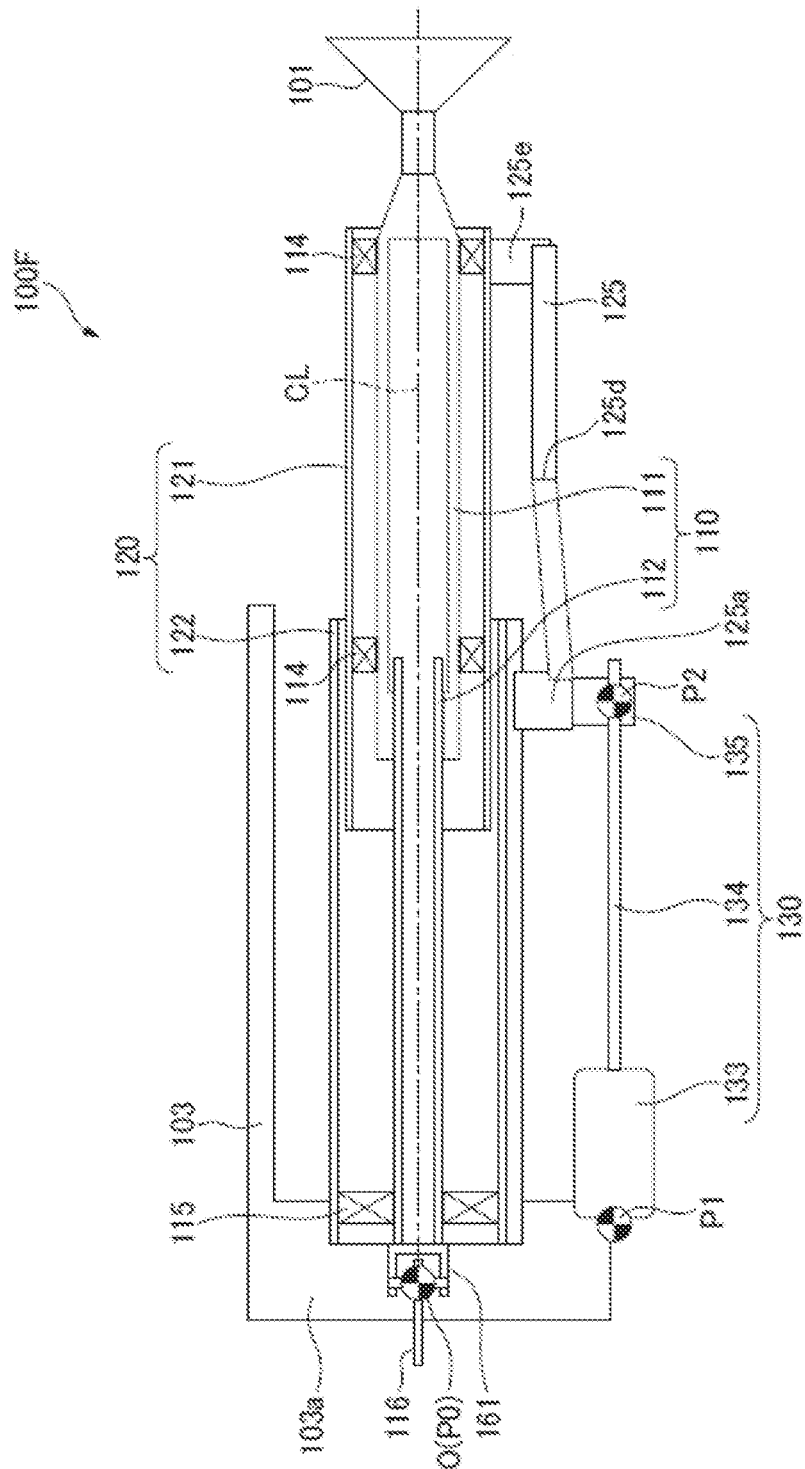
FIG. 11 is a sectional view schematically showing an electrically adjustable steering column according to a modification of the third embodiment.

The deformation starting point may be a bent portion 125d that is bent so as to protrude upward (toward the first jacket member 121) at the substantially intermediate portion of the extension bracket 125 in the axial direction, as in an electrically adjustable steering column 100F shown in FIG. 11. The bent portion 125d bends the extension bracket 125 upward when a large load in a longitudinal direction acts on the extension bracket 125 at the time of a vehicle collision or the like. In this way, by providing the extension bracket 125 with the bent portion 125d, the deformation direction of the extension bracket 125 can be controlled in a direction away from the driver, and the driver can be protected.

The present invention is not limited to the embodiments and the modifications described above, and modifications, improvements, and the like can be made as appropriate.

As described above, the present description discloses the following matters.

(1) An electrically adjustable steering column including:
a top bracket attached to a vehicle body;
a steering shaft to which a steering wheel is connected;
a steering jacket held by the top bracket and configured to rotatably support the steering shaft on an inner side; and
an actuator configured to adjust lengths of the steering shaft and the steering jacket,
wherein the steering jacket includes a first jacket member and a second jacket member in this order from a side proximal to the steering wheel, and the first jacket member and the second jacket member overlap each other such that the steering jacket is extendable and retractable in an axial direction, and wherein the actuator is connected to an extension bracket that is attached to an outer surface of the first jacket member and extends toward the front of the vehicle body, so as to extend and retract the first jacket member with respect to the second jacket member.

According to this configuration, the telescopic mechanism can be configured while ensuring rigidity without providing a long hole in a side surface of the steering jacket.

(2) The electrically adjustable steering column according to (1), wherein the extension bracket is attached to an outer surface of the first jacket member on the side proximal to the steering wheel and extends toward the front of the vehicle body.

According to this configuration, the stroke of the telescopic mechanism can be increased.

(3) The electrically adjustable steering column according to (1), wherein the actuator is provided between the top bracket and the first jacket member, and a motor of the actuator is fixed to the top bracket.

According to this configuration, the steering jacket can be extended and. Further, by fixing the motor to the top bracket having high rigidity, the natural frequency of the steering jacket can be increased to reduce the chance of resonance.

(4) The electrically adjustable steering column according to (1), wherein the actuator is provided between the first jacket member and the second jacket member, and a motor of the actuator is fixed to the second jacket member.

According to this configuration, the actuator is disposed without protruding toward the front of the vehicle, the stroke of the telescopic mechanism can be increased, and the degree of freedom of the shape of the top bracket can be increased.

(5) The electrically adjustable steering column according to any one of (1) to (4), wherein the second jacket member includes a guide portion configured to guide movement of the extension bracket.

According to this configuration, a movement direction of the extension bracket can be stably guided by the guide portion.

(6) The electrically adjustable steering column according to (5), wherein the guide portion holds the extension bracket so as to prevent rotation and movement in a radial direction of the extension bracket with respect to an axis of the electrically adjustable steering column.

According to this configuration, rotation and movement in the radial direction of the extension bracket can be prevented.

(7) The electrically adjustable steering column according to (1), wherein the actuator includes a motor disposed on the top bracket or the second jacket member, a screw shaft rotationally driven by the motor, and a nut to be screwed to the screw shaft to move on the screw shaft, and wherein at least one of a breaking mechanism configured to separate the extension bracket and the nut and a load generating mechanism configured to generate an energy absorbing load is provided on the extension bracket or between the extension bracket and the nut.

According to this configuration, at the time of a vehicle collision or the like, a force acting on the electrically adjustable steering column can be released or absorbed to protect an occupant.

(8) The electrically adjustable steering column according to (1), wherein the extension bracket has a deformation starting point causing the extension bracket to deform in a predetermined direction in a radial direction at the time of a vehicle collision.

According to this configuration, at the time of a vehicle collision or the like, the deformation direction of the extension bracket can be controlled to protect the occupant from the deformed extension bracket.

(9) The electrically adjustable steering column according to (1), wherein the extension bracket extends in the axial direction at a position offset from a straight line connecting a coupling point between the actuator and the top bracket or between the actuator and the second jacket member and a coupling point between the actuator and the extension bracket.

According to this configuration, a displacement direction of the actuator and the extension bracket can be controlled.

(10) The electrically adjustable steering column according to (1), wherein the steering shaft includes a first shaft member and a second shaft member in this order from the side proximal to the steering wheel, and the first shaft member and the second shaft member overlap each other such that the steering shaft is extendable and retractable in an axial direction.

According to this configuration, the steering shaft can be implemented by two shaft members including the first shaft member and second shaft member.

What is claimed is:

1. An electrically adjustable steering column comprising:
a top bracket attached to a vehicle body;
a steering shaft to which a steering wheel is connected;
a steering jacket held by the top bracket and configured to rotatably support the steering shaft on an inner side; and
an actuator configured to adjust lengths of the steering shaft and the steering jacket,
wherein the steering jacket includes a first jacket member and a second jacket member in this order from a side proximal to the steering wheel, and the first jacket member and the second jacket member overlap each other such that the steering jacket is extendable and retractable in an axial direction,
wherein the actuator is connected to an extension bracket that is attached to an outer surface of the first jacket member and extends toward the front of the vehicle body, so as to extend and retract the first jacket member with respect to the second jacket member,
wherein the extension bracket is attached to an outer surface of the first jacket member on the side proximal to the steering wheel and extends toward the front of the vehicle body,
wherein the second jacket member includes a guide portion configured to guide movement of the extension bracket,
wherein the guide portion holds the extension bracket so as to prevent rotation and movement in a radial direction of the extension bracket with respect to an axis of the electrically adjustable steering column,
wherein the actuator includes a motor, a screw shaft rotationally driven by the motor, and a nut to be screwed to the screw shaft to move on the screw shaft, and wherein the extension bracket slidably contacts the guide portion and is coupled to the nut.

2. The electrically adjustable steering column according to claim 1,
wherein the actuator is provided between the top bracket and the first jacket member, and a motor of the actuator is fixed to the top bracket.

3. The electrically adjustable steering column according to claim 1,
wherein the actuator is provided between the first jacket member and the second jacket member, and a motor of the actuator is fixed to the second jacket member.

4. The electrically adjustable steering column according to claim 1,
wherein the extension bracket extends in the axial direction at a position offset from a straight line connecting a coupling point between the actuator and the top bracket or between the actuator and the second jacket member and a coupling point between the actuator and the extension bracket.

5. The electrically adjustable steering column according to claim 1,
wherein the steering shaft includes a first shaft member and a second shaft member in this order from the side proximal to the steering wheel, and the first shaft member and the second shaft member overlap each other such that the steering shaft is extendable and retractable in an axial direction.

6. An electrically adjustable steering column comprising:
a top bracket attached to a vehicle body;
a steering shaft to which a steering wheel is connected;
a steering jacket held by the top bracket and configured to rotatably support the steering shaft on an inner side; and
an actuator configured to adjust lengths of the steering shaft and the steering jacket,
wherein the steering jacket includes a first jacket member and a second jacket member in this order from a side proximal to the steering wheel, and the first jacket member and the second jacket member overlap each other such that the steering jacket is extendable and retractable in an axial direction,
wherein the actuator is connected to an extension bracket that is attached to an outer surface of the first jacket member and extends toward the front of the vehicle body, so as to extend and retract the first jacket member with respect to the second jacket member,
wherein the actuator includes a motor disposed on the top bracket or the second jacket member, a screw shaft rotationally driven by the motor, and a nut to be screwed to the screw shaft to move on the screw shaft, and
wherein at least one of a breaking mechanism configured to separate the extension bracket and the nut and a load generating mechanism configured to generate an energy absorbing load is provided on the extension bracket or between the extension bracket and the nut.

7. An electrically adjustable steering column comprising:
a top bracket attached to a vehicle body;
a steering shaft to which a steering wheel is connected;
a steering jacket held by the top bracket and configured to rotatably support the steering shaft on an inner side; and
an actuator configured to adjust lengths of the steering shaft and the steering jacket,
wherein the steering jacket includes a first jacket member and a second jacket member in this order from a side proximal to the steering wheel, and the first jacket member and the second jacket member overlap each other such that the steering jacket is extendable and retractable in an axial direction,
wherein the actuator is connected to an extension bracket that is attached to an outer surface of the first jacket member and extends toward the front of the vehicle body, so as to extend and retract the first jacket member with respect to the second jacket member, and
wherein the extension bracket has a deformation starting point causing the extension bracket to deform in a predetermined direction in a radial direction at the time of a vehicle collision.

* * * * *